Feb. 11, 1947.  R. S. HOPKINS  2,415,635
ILLUMINATION ARRANGEMENT FOR PHOTOGRAPHIC ENLARGERS
Filed May 26, 1944  2 Sheets-Sheet 2

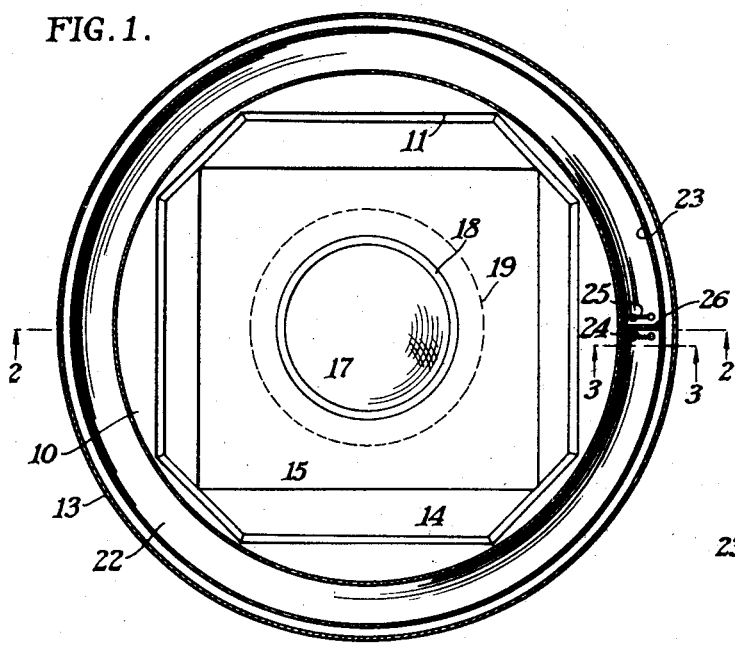
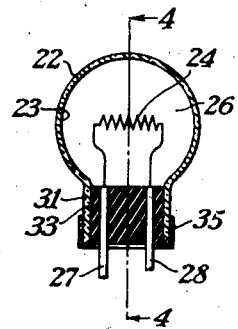
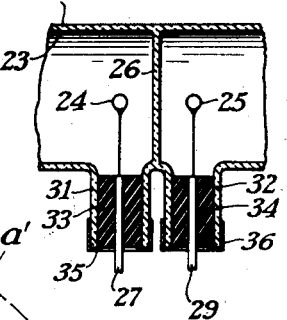
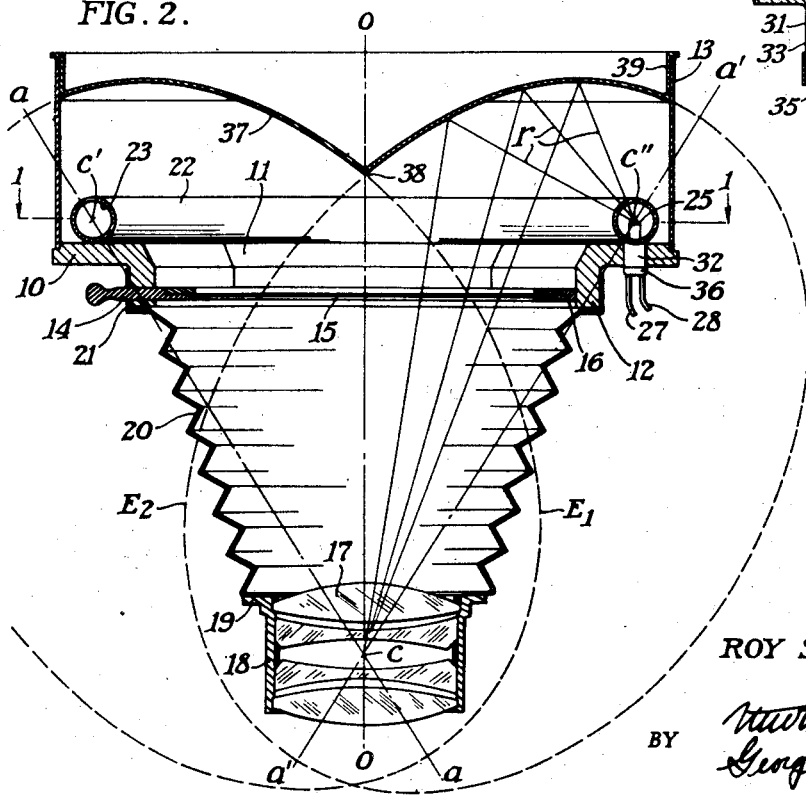
ROY S. HOPKINS
INVENTOR

ROY S. HOPKINS
INVENTOR
BY
ATTORNEYS

Patented Feb. 11, 1947

2,415,635

UNITED STATES PATENT OFFICE 2,415,635

ILLUMINATION ARRANGEMENT FOR PHOTOGRAPHIC ENLARGERS

Roy S. Hopkins, Rochester, N. Y., assignor to Eastman Kodak Company, Rochester, N. Y., a corporation of New Jersey Application May 26, 1944, Serial No. 537,412

3 Claims. (Cl. 88—24)

1

The present invention relates to a photographic enlarger and more particularly to an improved illuminating and reflecting system for a photographic enlarger.

It is well known that there is considerable difficulty in manufacturing an enlarger having an efficient and effective light source and still providing even illumination over the copy board. In the past, efforts have been made to render the illumination uniform by diffusing mediums and differential diffusing mediums but obviously such diffusers seriously reduce the light available on the copy board. Another manner of endeavoring to obtain proper illumination for an enlarger has been to place the light source outside the field of the lens but this has introduced other complications either in the form of the enlarger or its reflectors.

The primary object of the present invention is the provision of a photographic enlarger having an annular light source and having a reflector with an annular ellipsoidal surface composed of arcs of ellipses each having one focus substantially at the center of the lens and the other focus substantially at the annular light source.

Another object of the invention is the provision of an enlarger lamphouse containing an annular light source having a toroidal light emitting envelope and including an annular ellipsoidal surface for uniformly directing all of the available light from the annular light source to the objective lens of the enlarger.

A further object of the invention is the provision of a photographic enlarger comprising a lamphouse containing an annular light source located outside of the field of the objective lens and containing an annular ellipsoidal reflector having one focus of its ellipses substantially at the annular light source and the other focus of said ellipse substantially at the center of the lens.

Other and further objects of the invention will be suggested to those skilled in the art by the description which follows:

The above and other objects of the invention are embodied in a photographic enlarger comprising a lamphouse having a wall provided with a light opening, an objective lens spaced from the lamphouse and having an optical axis extending therethrough, an annular light source therein with its radial center substantially on said optical axis and having a cross sectional center forming a circle around said axis, and an annular reflecting surface in the lamphouse composed of arcs of ellipses, each of which has one focus substantially at the center of the lens and the other

2 focus substantially at the annular light source. The annular reflecting surface preferably has a diameter greater than that of the annular light source but less than the chord subtending the angle between the major axes of a pair of diametrically opposed ellipses for forming the ellipsoidal surface.

Reference is hereby made to the accompanying drawings wherein similar reference characters designate similar elements and wherein, Fig. 1 is a horizontal section through the lamphouse according to the invention and taken on the line 1—1 of Fig. 2.

Fig. 2 is a vertical cross section through the photographic enlarger and taken on the line 2—2 of Fig. 1.

Fig. 3 is a cross section through the annular light source and taken on the line 3—3 of Fig. 1.

Fig. 4 is a fragmentary longitudinal section through said annular light source taken on the line 4—4 of Fig. 3.

Figure 5:
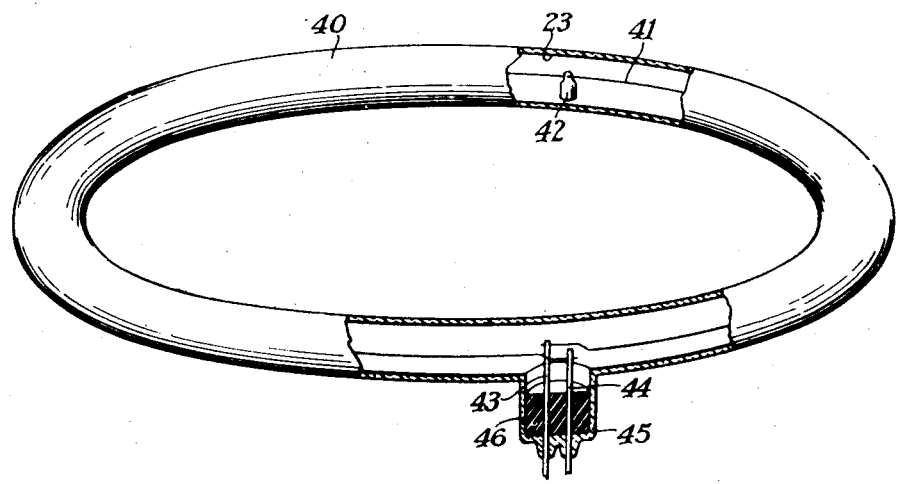
Fig. 5 is a perspective, with sections broken away, showing another form of annular light source that can be used according to the invention.
Figure 6:
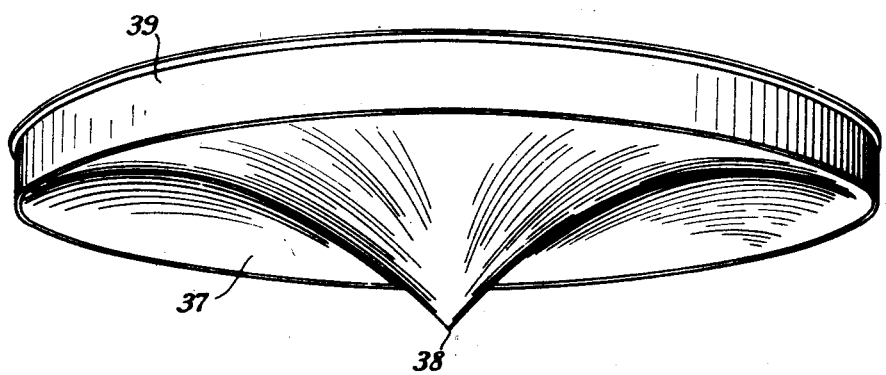
Fig. 6 is a detailed perspective of the reflecting member having an ellipsoidal surface according to the invention.

In the illustrated embodiment, the annular light source is shown either as a fluorescent circular lamp or an incandescent circular lamp. However, it is to be understood that any substantially continuous and uniform circular light source may be used. A photographic enlarger according to the invention includes a lamphouse, an objective lens, a negative carrier and an annular light source. Although such elements are present in most forms of enlargers, the arrangement of the annular light source and the annular ellipsoidal reflector constitute the principal subject matter of the present invention.

The lamphouse is preferably cylindrical in form and may be supported from a standard in any known fashion. The lamphouse comprises a lower wall or support 10 provided with an opening 11 and with a depending portion 12 encircling said opening 11. A cylindrical side wall 13 is mounted in any suitable manner upon support 10 and may constitute a support or mount for the reflecting member later to be described. A negative carrier 14 may be slidably mounted in the usual way upon the lower part of the lamphouse or within the depending portion 12 of lower support 10. Such negative carrier preferably includes a fixed glass platen 15 held in the carrier by frame 16. Any known means or technique may be used for holding the photographic negative flat in the negative carrier 14.

An objective assembly comprises an objective lens 17, preferably composed of several elements and preferably mounted in a lens barrel 18 having a collar 19. The objective assembly is mounted in a known manner in adjustable spaced relation to the lamphouse and a collapsible bellows 20 has one end attached to the collar 19 of the objective assembly and the other end attached to the depending portion 12 of support 10 by a rim 21. The optical axis O—O of the objective lens 17 extends through the lamphouse and also through the opening 11 in the support 10.

According to the invention, the light source for the enlarger has an annular formation and may be of the fluorescent, incandescent or other known type of lamp. The annular fluorescent light source is preferred because of the relatively low temperature of operation and elimination of ventilation or heat dissipation difficulties. Nevertheless, an incandescent or other form of lamp is satisfactory from the viewpoint of illumination or light emission, particularly when frosted or opal glass envelopes are used. The light source as shown in Figs. 1 to 4, inclusive, is the preferred form of annular fluorescent lamp comprising an annular glass envelope 22 provided internally in a known manner with a fluorescent coating 23 and having electrodes 24 and 25. A transparent partition 26 is placed between said electrodes 24 and 25 and a pair of leads 27 and 28 extends from electrode 24 and a pair of leads 29 extends from electrode 25 for connection to the usual auxiliary apparatus for operation of fluorescent lamps. Specifically, the glass envelope 22 has a pair of depending tubes 31 and 32, respectively, containing insulating and sealing plugs 33 and 34, covered by caps 35 and 36 and through which the respective pair of leads 27 and 28 and pair of leads 29 extend. The annular light source or its transparent or glass envelope 22 is mounted upon the support 10 in any suitable manner, as by brackets or supports, or may be simply laid upon the support 10. The tubes 31 and 32 extend through corresponding holes in the support 10 and may serve as locating means for the lamp.

The arrangement of the annular light source with respect to the opening 11 in the lower wall or support 10 of the lamphouse and/or with respect to the opening in negative carrier 14 is such that no direct rays from the light source reach the objective lens 17. This effective placement of the light source outside of the field of the lens eliminates any "hot spots" in the illuminated area.

The essence of the invention resides in the direction of the light from the annular light source, through the photographic negative on the negative carrier 14 and through the objective lens 17. A remarkably efficient reflector for this purpose comprises an annular ellipsoidal surface composed of arcs of ellipses each having on focus at the center of the objective lens and the other focus substantially at the annular light source. In this connection it is pointed out that the annular light source has a radial center, which as shown, is substantially on the optical axis O—O and also has a radial cross section taken perpendicularly through the annular light source. Preferably, the envelope of the annular light source is toroidal or an annular torus so that such radial cross section becomes a circle with its center forming another circle around the optical axis O—O.

The reflecting member according to the invention comprises an annular ellipsoidal surface 37 having a cusp 38 substantially upon the optical axis O—O. Said ellipsoidal surface 37 may be attached to a flanged ring 39 fitting into and engaging the upper edge of the cylindrical side wall 13. Although the ellipsoidal surface 37 is herein sometimes referred to as a surface of revolution, it shall be understood that said surface 37 may be made in any suitable fashion as by spinning, turning, stamping, molding, etc. The most efficient form of said ellipsoidal surface 37 is that wherein each elliptical arc of said surface 37 is part of an ellipse having one focus substantially at the center of the lens and having the other focus substantially at the annular light source.

In Fig. 2 the form of the ellipses including such arcs are shown in dotted lines. The ellipse $E_1$ has its major axis $a$—$a$ extending through the center $c$ of objective lens 17 and through the center $c'$ on the circular center of the annular light source. The ellipse $E_2$ has its major axis $a'$—$a'$ extending through the center $c$ of objective lens 17 and through the center $c''$ of the annular light source. As a result, one focus of ellipse $E_1$ is at the center $c$ of objective lens 17 and its other focus is at the center $c'$ of the annular light source. Also, one focus of the ellipse $E_2$ is at the center $c$ of objective lens 17 and its other focus is at the center $c''$ of the annular light source. The annular ellipsoidal surface 37 may also be considered as generated by revolution of the ellipse $E_1$ or the ellipse $E_2$ around a conical surface defined by the major axes $a$—$a$ and $a'$—$a'$ of said ellipses.

The diameter of the annular ellipsoidal surface 37 should preferably, as shown, be greater than the diameter of the annular light source. However, the diameter need not be greater or even equal to the chord subtending the angle between the axes $a$—$a$ and $a'$—$a'$ because any reflecting surface between the points $a$ or $a'$ and the outer edge of the ellipsoidal surface 37 would merely reflect light rays back into the annular light source or into the lower wall or support 10. The ellipsoidal surface 37 as shown by the rays $r$ directs all light rays from the center of the annular light source to the center of the objective lens 17. Likewise, other rays emanating from the annular light source are directed to the objective lens 17, although the path of the light ray is not from focus to focus of the ellipse. This fact also permits some latitude, particularly in production, in the location of the annular light source with respect to the ellipsoidal surface. In other words, the improved results of the invention will be obtained even though the upper foci of the ellipses forming the ellipsoidal surface 37 are only substantially at the annular light source or within its radial cross section.

The annular light source may also be provided as a circular incandescent lamp. Such circular incandescent lamp comprises a glass envelope 40 preferably frosted or of opal glass and containing a filament 41 mounted within the envelope 40 on supports 42. For connection to a source of electricity one end of filament 41 is connected to a lead 43 and its other end is connected to a lead 44. A depending projection 45, which may be blown out of the glass of envelope 40 encloses a sealing and insulating plug 46 through which the leads 43 and 44 extend. The circular light source may also have other forms such as individual lamps placed in a ring and illuminating an opal glass ring or a differentially frosted glass ring at the upper foci of the ellipse forming the ellipsoidal surface 37.

When the annular light source gives precisely uniform illumination throughout its circumference the ellipsoidal surface 37 has a specular surface and maximum efficiency will be obtained. However, if said annular light source does not give precisely uniform illumination, a matte or diffusing surface is provided on said ellipsoidal surface 37 and the degree of diffusion is increased with the lack of uniformity of the light source.

Obviously, the illuminating and reflecting system of the invention is capable of other variations than those stated herein and the present disclosure is to be construed in an illustrative sense. The scope of the invention is defined by the claims which follow.

Having now particularly described my invention, what I desire to secure by Letters Patent of the United States and what I claim is:

1. A photographic enlarger comprising a lamphouse, an objective lens spaced therefrom and having an optical axis extending through said lamphouse, an annular light source within said lamphouse, encircling said axis and having a radial cross section, an intermediate member between said light source and lens and for preventing any direct rays from said light source to said lens, and a circular reflecting member in said lamphouse, having an ellipsoidal surface of revolution composed of arcs of ellipses each of which has its major axis extending through said lens and light source, and having a diameter greater than that of said light source and less than the chord subtending the angle between the major axes of diametrically opposed ellipses.

2. A photographic enlarger comprising a lamphouse, an objective lens spaced therefrom and having an optical axis extending through said lamphouse, an annular light source in said lamphouse, having its radial center substantially on said axis and having its cross sectional center located in a circle around said axis, and a reflecting member in said lamphouse entirely on the side of the light source opposite said lens, having an ellipsoidal surface symmetrical with respect to said axis and composed of arcs of ellipses each of which has its major axis extending through said lens and light source, and having a diameter greater than that of said light source and less than the chord subtending the angle between the major axes of diametrically opposed ellipses.

3. A photographic enlarger comprising a lamphouse having a wall provided with a light opening, an objective lens spaced therefrom and having an optical axis extending through said opening and lamphouse, an annular light source in said lamphouse, having its radial center substantially on said axis and having its cross sectional center forming a circle around said axis, and an annular reflecting surface in said lamphouse, composed of arcs of ellipses having their major axes extending through said lens and substantially through the cross sectional center of said light source, the diameter of said reflecting surface being greater than the diameter of said annular light source and less than the chord subtending the angle between the major axes of a pair of diametrically opposed ellipses.

ROY S. HOPKINS.

REFERENCES CITED

The following references are of record in the file of this patent:

UNITED STATES PATENTS

| Number | Name | Date |
| --- | --- | --- |
| 1,275,120 | Ballman et al. | Aug. 6, 1918 |
| 1,844,179 | Rennick | Feb. 9, 1932 |
| 1,341,674 | Rhodin | June 1, 1920 |
| 2,181,305 | Myers | Nov. 28, 1939 |
| 1,763,630 | Hopkins | June 10, 1930 |
| 2,342,115 | Blauvelt | Feb. 22, 1944 |
| 2,001,378 | Cornwall | May 14, 1935 |
| 1,935,729 | Rosenbaum | Nov. 21, 1933 |
| 2,189,577 | Conrad | Feb. 6, 1940 |